Patented Feb. 6, 1940

2,189,367

UNITED STATES PATENT OFFICE 2,189,367

ORTHO-HYDROXYCARBOXYLIC ACIDS OF THE DIPHENYLENE SERIES

Friedrich Muth, Leverkusen, Germany, assignor to General Aniline & Film Corporation, a corporation of Delaware No Drawing. Original application September 25, 1933, Serial No. 690,951. Divided and this application December 13, 1935, Serial No. 54,320. In Germany October 5, 1932

1 Claim. (Cl. 260—327)

The present invention relates to new ortho-hydroxy-carboxylic acids of the diphenylene series, more particularly it relates to compounds of the general formula:

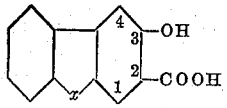

wherein $x$ stands for S, SO or $SO_2$.

In accordance with the present invention the compounds of the above identified formula are prepared by starting with the corresponding 3-hydroxydiphenylene compounds and treating them according to the synthesis of Kolbe in the presence of an alkali, or in form of an alkali metal salt thereof, with carbon-dioxide under superatmospheric pressure and at elevated temperature.

From the chemical behaviour of my new carboxylic acids results that the carboxylic acid group stands in ortho-position with respect to the hydroxy group, and from my present knowledge I assume that it has entered the 2-position; I wish it to be understood, however, that, in case the carboxylic acid group should have entered the other position ortho with respect to the hydroxy group, that is the 4-position, these compounds are falling within the scope of my invention.

The starting 3-hydroxy compounds are obtainable for example, by treating the corresponding 3-chloro-compounds with caustic aqueous alkali at elevated temperature and under superatmospheric pressure, or by diazotizing the corresponding 3-amino-compounds and boiling the diazo compounds obtained therefrom in the presence of phosphoric acid.

My new ortho-hydroxycarboxylic acids are generally water-insoluble more or less yellow colored substances, soluble in aqueous alkalies and organic solvents and are valuable intermediate products in the manufacture of dyestuffs.

The invention is illustrated by the following examples, without being restricted thereto:

Example 1.—20 parts by weight of 3-hydroxyphenylenesulfide are transformed into the sodium salt and treated with carbon-dioxide under superatmospheric pressure at 210–220° C. during 8–10 hours. After cooling, the carbon-dioxide is removed, the content of the autoclave is dissolved in hot water and filtered. On cooling, from the filtrate crystallizes the sodium salt of the 3-hydroxydiphenyleneoxide-2-carboxylic acid in needles. The salt is filtered with suction, again dissolved in hot water, and the free acid is precipitated by the addition of hydrochloric acid. The 3-hydroxydiphenylenesulfide - 2 - carboxylic acid of the formula:

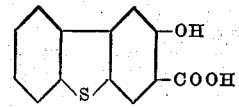

crystallizes from pyridine in yellow needles of the melting point 233° C. Its alcoholic solution yields a powerful blue coloration on the addition of ferric chloride.

Example 2.—21 parts by weight of 3-hydroxydiphenylenesulfone are transformed into the potassium salt and treated with carbon-dioxide under superatmospheric pressure and at elevated temperature as described in Example 1. The working up is performed according to the directions given in Example 1. The 3-hydroxydiphenylenesulfone-2-carboxylic acid of the formula:

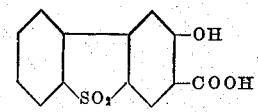

crystallizes from pyridine in needles of the melting point 284° C.

The starting 3-hydroxydiphenylenesulfone is obtainable for example, by heating 60 parts by weight of 3-bromodiphenylenesulfone with 125 parts by weight of crystallized barium hydroxide, 20 parts by weight of copper oxide and 250 parts by weight of water in an autoclave at 220° C. for 24 hours, boiling the reaction product repeatedly with water, filtering the extracts and acidifying the filtrates with hydrochloric acid.

In analogous manner as described in paragraph 1 the 3-hydroxydiphenylenesulfoxide yields the 3-hydroxydiphenylenesulfoxide-2-carboxylic acid and corresponding to the following formula:

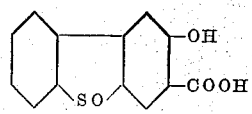

The 3-hydroxydiphenylenesulfoxide is obtainable by dissolving 3-aminodiphenylenesulfoxide in hot technical phosphoric acid, cooling the solution to 0–5° C., diazotizing in the usual manner with aqueous sodium nitrite solution, and dropping the diazo solution into a flask heated at 180–200° C., thereby simultaneously passing through that flask superheated steam of 180–200°

C. The 3-hydroxydiphenylenesulfoxide distills off with the steam.

This is a divisional application of my co-pending application for Letters Patent Serial No. 690,951, filed September 25, 1933.

I claim:

The hydroxy carboxylic acid of diphenylenesulfide which is obtained by causing carbon dioxide to react upon 3-hydroxy-diphenylenesulfide in the presence of an alkali, said compound being a yellow crystalline substance of a melting point of 283° C.

FRIEDRICH MUTH.